United States Patent [19]
McLean

[11] Patent Number: 5,957,796
[45] Date of Patent: Sep. 28, 1999

[54] BELT GUARD

[76] Inventor: Vernon McLean, Box 950, Estevan, Saskatchewan, Canada, S4A 2A7

[21] Appl. No.: 09/044,422

[22] Filed: Mar. 19, 1998

[51] Int. Cl.[6] .............................. F16H 57/02; F16H 7/24; F16H 21/32; F04B 23/00
[52] U.S. Cl. .............................. 474/146; 474/150; 74/41; 74/606 R; 417/313
[58] Field of Search .................................... 474/144, 146, 474/148, 150; 74/606 R, 609, 41; 417/313

[56] References Cited

U.S. PATENT DOCUMENTS

| | | | |
|---|---|---|---|
| 3,811,340 | 5/1974 | Morse | 474/146 |
| 3,927,578 | 12/1975 | Mattila | 474/146 |
| 4,245,518 | 1/1981 | Toyokuni et al. | 474/146 |
| 4,295,383 | 10/1981 | Frost | 474/146 |
| 4,504,093 | 3/1985 | Grasse | 474/146 |
| 5,277,663 | 1/1994 | Lemme et al. | 474/146 |
| 5,312,303 | 5/1994 | Hinschlager | 474/146 |
| 5,520,584 | 5/1996 | Brown, III | 474/146 |
| 5,664,347 | 9/1997 | Chapman, Sr. et al. | 474/146 |

*Primary Examiner*—John A. Jeffery
*Assistant Examiner*—Matthew A. Kaness
*Attorney, Agent, or Firm*—Adrian D. Battison; Murray E. Thrift

[57] ABSTRACT

A cover for a pump jack includes a main rear wall with two slots for engaging over a pair of shafts of the pump jack at the drive belt on the pulleys on the drive shafts. The rear cover portion includes a peripheral wall extending around the sides and top of the peripheral edge with the bottom of the cover panel being opened. A front panel portion manufactures a single piece or as multiple pieces fits over the rear cover panel with a lip engaging onto the peripheral wall to which it is connected by latches. A stiffener member extends across the rear wall and closes the slots. A similar stiffener member can be attached across the front panel portion. Both the rear panel and the front panel are manufactured from glass fibre reinforced resin allowing the product to be manufactured in lightweight. The front cover panel can therefore be readily removed to allow replacement of the belt.

19 Claims, 4 Drawing Sheets

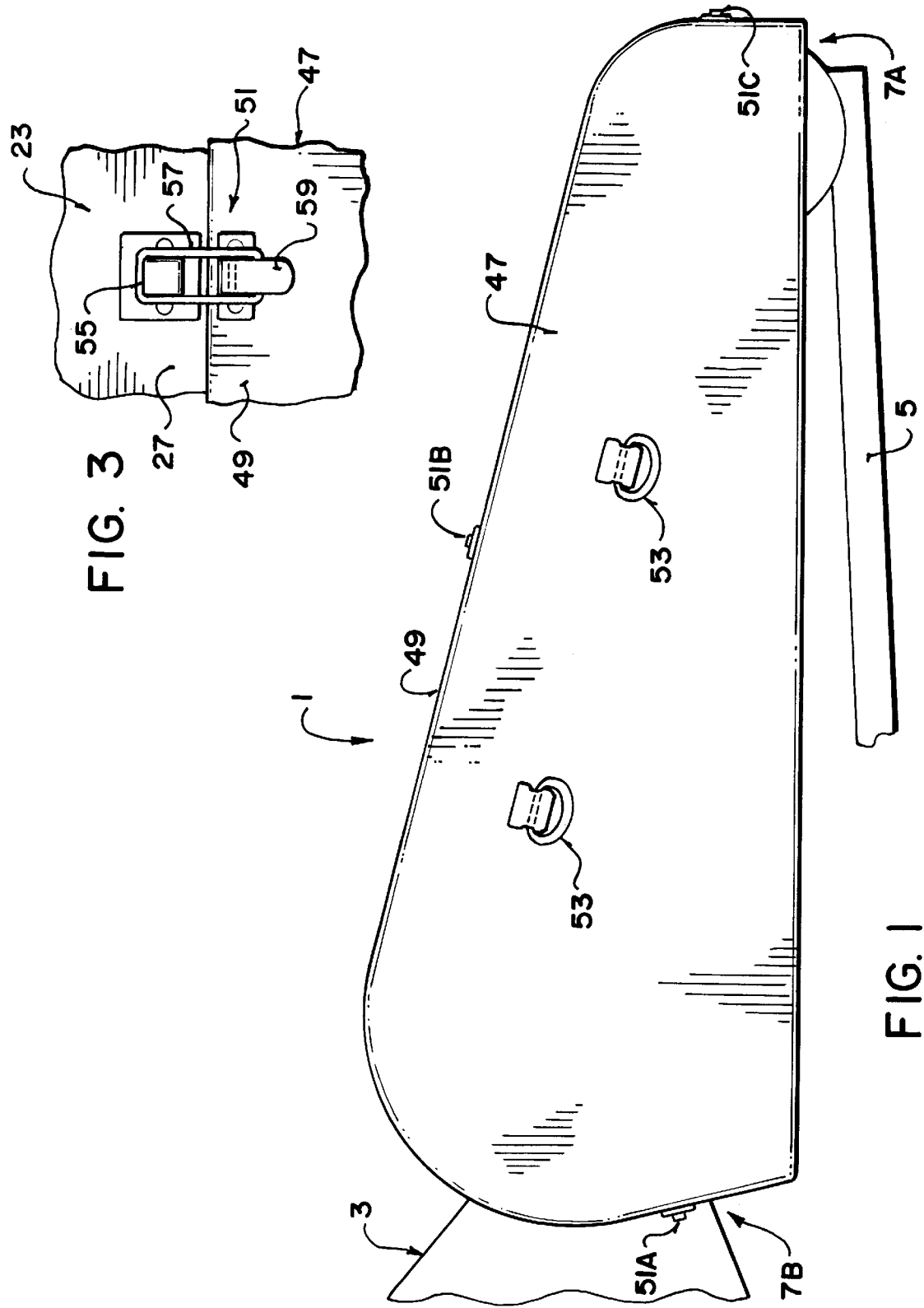

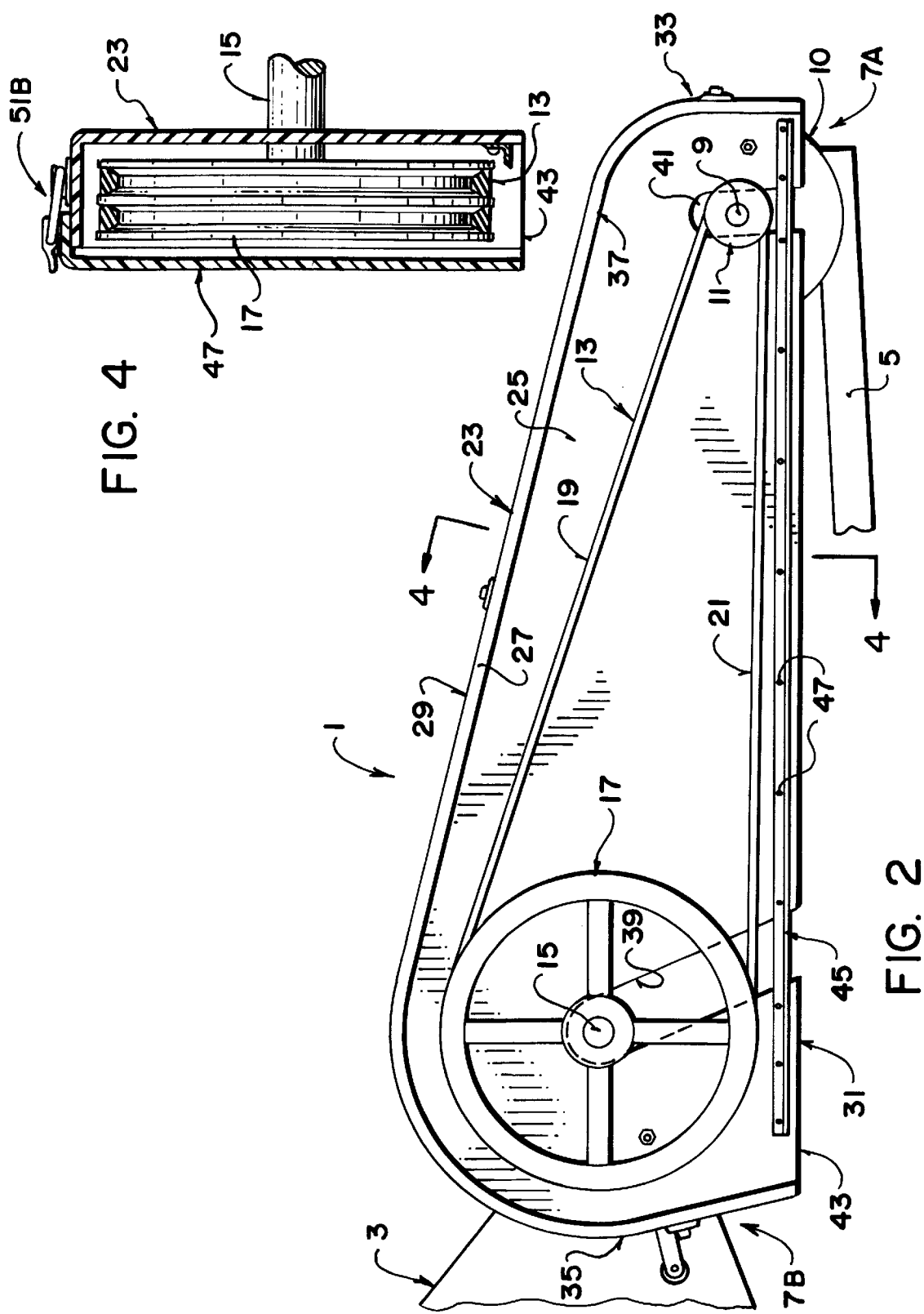

BELT GUARD

This invention relates to a belt guard or cover for an oil pump jack of the type comprising a pump frame, a mounter mounted on the frame and including the drive shaft with the drive pulley thereon, a main jack assembly, a driven shaft mounted on the main jack assembly for communicating power to the main jack assembly from the motor, the driven shaft including a driven pulley thereon for driving a receiving drive from the drive shaft, and a drive belt wrapped around the drive pulley and the driven pulley to define an upper belt run and a lower belt run, the drive pulley, driven pulley and the belt lying substantially in a common vertical plane at right angles to the horizontal drive shaft and the driven shaft.

BACKGROUND OF THE INVENTION

Many pump jacks of this type are widely used at various locations throughout all fields.

In some cases the belt and the pulleys are left uncovered and therefore are open to the elements where they can be damaged by water and ultra violet light.

It is highly desirable therefore to provide a suitable cover or guard both from the point of view of safety and from the point of view of protection of the devices in particular the belt. It will be appreciated that replacement of the belt is very expensive both from the point of view of the cost of the belt itself and also the labour necessary to carry out the replacement. Yet further the damaged belt can lead to significant down time with the additional cost of lost production.

Various covers have been provided for the belt generally manufactured from metal with various panels which we bolted together to form a structure substantially wholly surrounding the belt and the pulleys. The removal of the structure is therefore very complicated and as the structure is generally made of metal the elements are very heavy often requiring a crane to be moved to the remote location where the pump jack is positioned again significantly increasing the cost.

SUMMARY OF THE INVENTION

It is one object of the present invention to provide an improved cover for the belt drive of a pump jack.

According to the invention there is provided a belt cover for an oil pump jack, the pump jack comprising:
  a pump frame;
  a motor mounted on the frame and including a drive shaft with a drive pulley thereon,
  a main jack assembly;
  a driven shaft mounted on the main jack assembly for communicating power to the main jack assembly from the motor, the driven shaft including a driven pulley thereon for driving a receiving drive from the drive shaft:
  and a drive belt wrapped around the drive pulley and the driven pulley to define an upper belt run and a lower belt run, the drive pulley, driven pulley and the belt lying substantially in a common vertical plane at right angles to the horizontal drive shaft and the driven shaft;
the belt cover comprising:
  a main cover portion having:
    a main rear wall arranged to lie parallel to and adjacent to the plane, the main wall extending to a peripheral edge which has a top portion above the upper run, a bottom portion below the lower run, a first end portion beyond the drive pulley and a second end portion beyond and driven pulley;
    and an edge wall at right angles to and extending forwardly from the main wall and arranged around at least a part of the peripheral edge including the top portion and the end portions, the edge wall having a width from the main wall such that it extends to a plane forwardly of the belt opposite the main rear wall;
  a front cover portion having:
    a main front wall parallel to and substantially coextensive with the main rear wall;
    and a peripheral lip at right angles to and extending rearwardly from the front wall and arranged around at least a part of the peripheral edge including the top portion and the end portions so as to engage over the edge wall in at least partly overlapping arrangement;
    and a plurality of fasteners locating the front cover portion on the main cover portion;
  the front cover portion and the main cover portion being formed from a molded plastics material.

Preferably the cover portions are molded from a fibre reinforced resin material.

Preferably the cover portions are molded on the same mold.

Preferably the cover portions are both open along a bottom edge so as to be free from the peripheral wall and the peripheral lip at the bottom edge. Preferably each of the cover portions has a substantially rigid stiffener member attached along the bottom edge.

Preferably the stiffener members each comprise an angle iron.

Preferably the rear main cover portion has two slots therein extending from the bottom edge for allowing the drive and driven shafts respectively to slide into position within the main rear wall.

Preferably the rear main cover portion has two slots therein extending from the bottom edge for allowing the drive and driven shafts respectively to slide into position within the main rear wall and wherein the stiffener member extends across the slots.

Preferably each of the slots extends parallel to the respective adjacent end portion of the peripheral wall, and wherein the slots are arranged at an angle to each other.

Preferably the end portion of the peripheral wall at the driven pulley follows the curvature of the pulley and ends with a portion which is at an angle to the bottom run of the belt.

Preferably the fasteners comprise clips having elements thereof mounted on the peripheral wall and the peripheral lip.

Preferably the peripheral wall is wider than the peripheral lip so as to leave a part of the peripheral wall exposed beyond the edge of the peripheral lip.

Preferably the main cover portion is mounted on the frame of the pump jack so as to remain in place thereon when the front cover portion is removed.

Preferably the front cover portion is formed in a plurality of separate pieces divided at least one join line arranged from a top edge to a bottom edge of the cover.

Preferably the pieces of the front cover portion are connected at the join line by a connector strip extending along the join line.

Preferably the connector strip is H-shaped in cross-section.

Preferably there is provided at least one.

Preferably the pieces of the front cover include a central fixed piece and two removable end pieces.

Preferably the central fixed piece includes a bottom rail and a pair of spacer members connected between the main cover and the front cover at the bottom rail.

BRIEF DESCRIPTION OF THE DRAWINGS

One embodiment of the invention will now be described in conjunction with the accompanying drawings in which:

FIG. 1 is a front elevational view of the present invention.

FIG. 2 is a front elevational view of the present invention, similar to that of FIG. 1, with the front cover removed FIG. 3 is a partial view of the present invention showing the fastening members.

FIG. 4 is a vertical cross section along the lines 4—4 of FIG. 2 of the present invention.

In the drawings like characters of reference indicate corresponding parts in the different figures.

DETAILED DESCRIPTION

Figure 5:
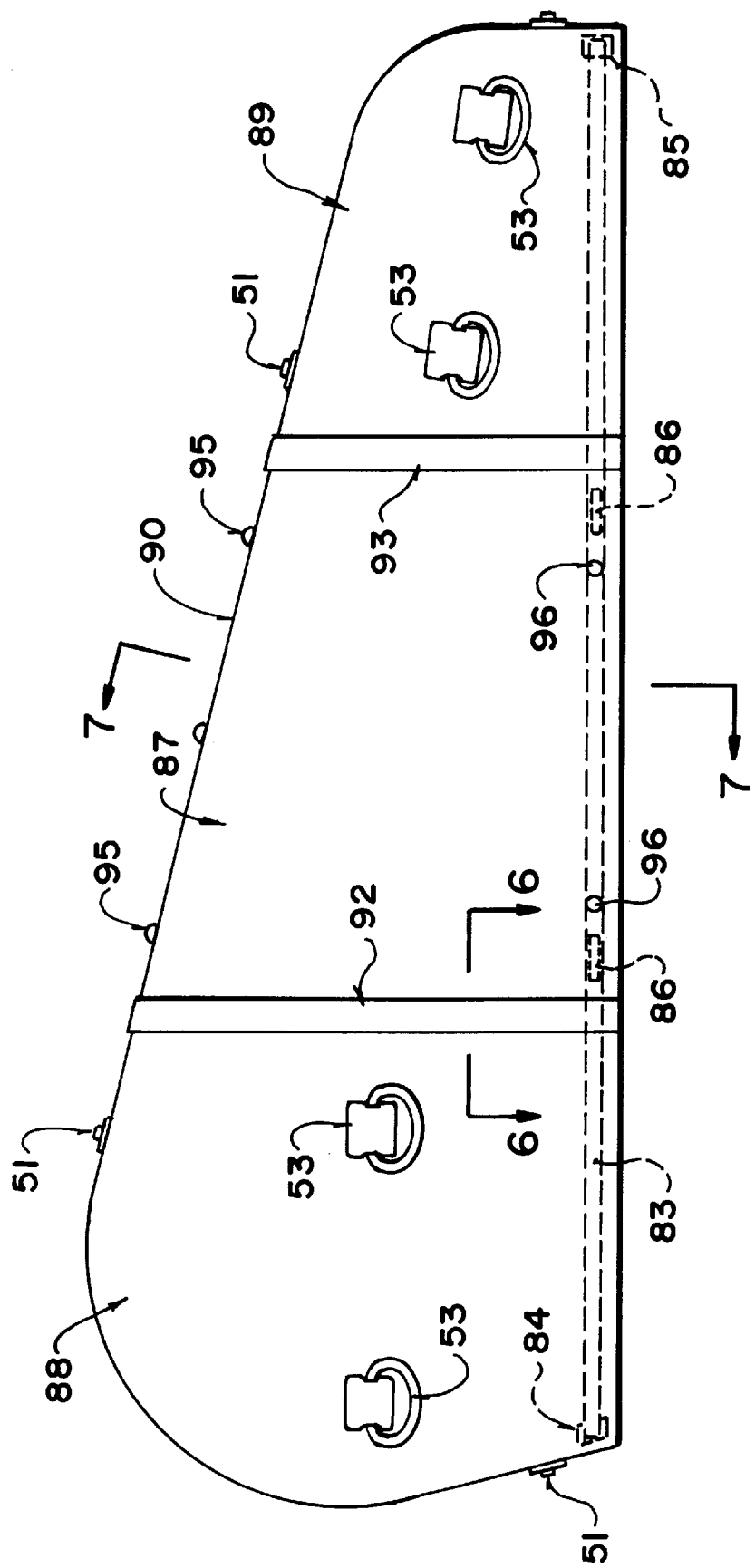
FIG. 5 is a front elevational view of a second embodiment of the present invention.

A belt cover 1 for an oil jack 3 is mounted on a pump frame 5. The belt cover 1 is mounted on the oil jack at mount point 7A and 7B. Mount point 7A is located at the front most portion of the cover 1, where the mount assembly 7A includes a drive shaft 9. The drive shaft is driven by a motor 10 which turns a first drive pulley 11.

A drive belt 13 is wrapped around the drive pulley 11 and extends rearwardly to wrap around a driven shaft 15.

The driven shaft 15 is mounted on the jack assembly for communicating power to the main jack 3 from the motor 10. The driven shaft includes a driven pulley 17 for driving a receiving drive from the drive shaft 9.

The drive belt 13 wrapped around the drive pulley 11 and the driven pulley 17 to define an upper belt runs at 19 and a lower belt run 21. A driven pulley 17 and a belt 13 lie substantially in a common vertical plane at right angles to the horizontal drive shaft 9 and the driven shaft 15.

The belt cover 1 has a main cover portion 23, having a rear wall 25 arranged to lie parallel and adjacent to the plane. The main wall 25 extends to form a peripheral edge 27.

The peripheral edge 27 has a top portion 29 above the upper run 19, a bottom portion 31 below the lower run 21, a first end portion 33 beyond the drive pulley 11 and a second end portion 35 beyond the driven pulley 17.

An edge wall 37 at right angles to and extended forwardly from the main wall 25 and arranged around at least a part of the peripheral edge 27 including the top portion 29 and the end portions 33 and 35. The edge wall 37 has a width from the main walls 25 such that it extends to a plane forwardly of the belt 13 opposite the main rear wall 25. The end portion of the peripheral wall at the driven pulley follows the curvature of the pulley and end with a portion which is at an angle to the bottom run of the belt. The bottom of the cover is open where there is no peripheral wall.

The rear main wall 25 has a rear slot 39 and a front slot 41 extending from the bottom edge 43 for allowing the drive shaft 9 and the driven shafts 15 respectively to slide into position within the main rear wall 37. The slots extend parallel to the respective adjacent end portion of the peripheral wall and they are arranged at an angle to each other so that the slot 41 is substantially vertical and the slot 39 is inclined upwardly and outwardly at the same angle as the wall edge 35. The angle allows the slot 41 to engage over the shaft 9 and then the main cover portion to pivot about the shaft p so that the slot 39 passes over the shaft 15. Thus the slot lies approximately on an arc surrounding the shaft 9 but is straight for ease of cutting the slot.

Along the bottom edge 43 of the rear wall 25 there is a substantially rigid stiffener member 45, which extends from a rear end of the bottom edge to the forward most end of the bottom edge 43. The stiffener member in the form of an angle iron is held on by a plurality of bolts 47.

The belt cover 1 has a front cover portion 47 which is parallel to and substantially coextensive with the main rear wall 25. The front cover 47 has a peripheral lip 49 at right angles to and extending forwardly from the front wall 47 and arranged around at least part of the peripheral edge 27 including the top portion 29 and the end portions 33 and 35 so as to engage over the edge wall 37 in at least partly overlapping arrangement.

The main portion 23 and the front cover portion 47 of the belt cover 1 are held together by a plurality of over center latches 51A, 51B and 51C. The latches 51A, 51B and 51C are mounted on the peripheral wall 27 and the peripheral lip 49. The latches are made up of an abutment 55, a loop 57 and a latch arm 59. The loop 57 surrounds the abutment 55 and then the latch arm 59 is pulled back into place attaching the cover 47 and the main portion 23. The abutment 55 is located on the main portion 23 and the latch arm is located on the cover portion 47.

The cover portion 47 has a plurality of handles 53 for removing the cover. The main portion 23 remains in place on the frame 5 of the pump jack 3 when the front cover portion 47 is removed.

Figures 6, 7:
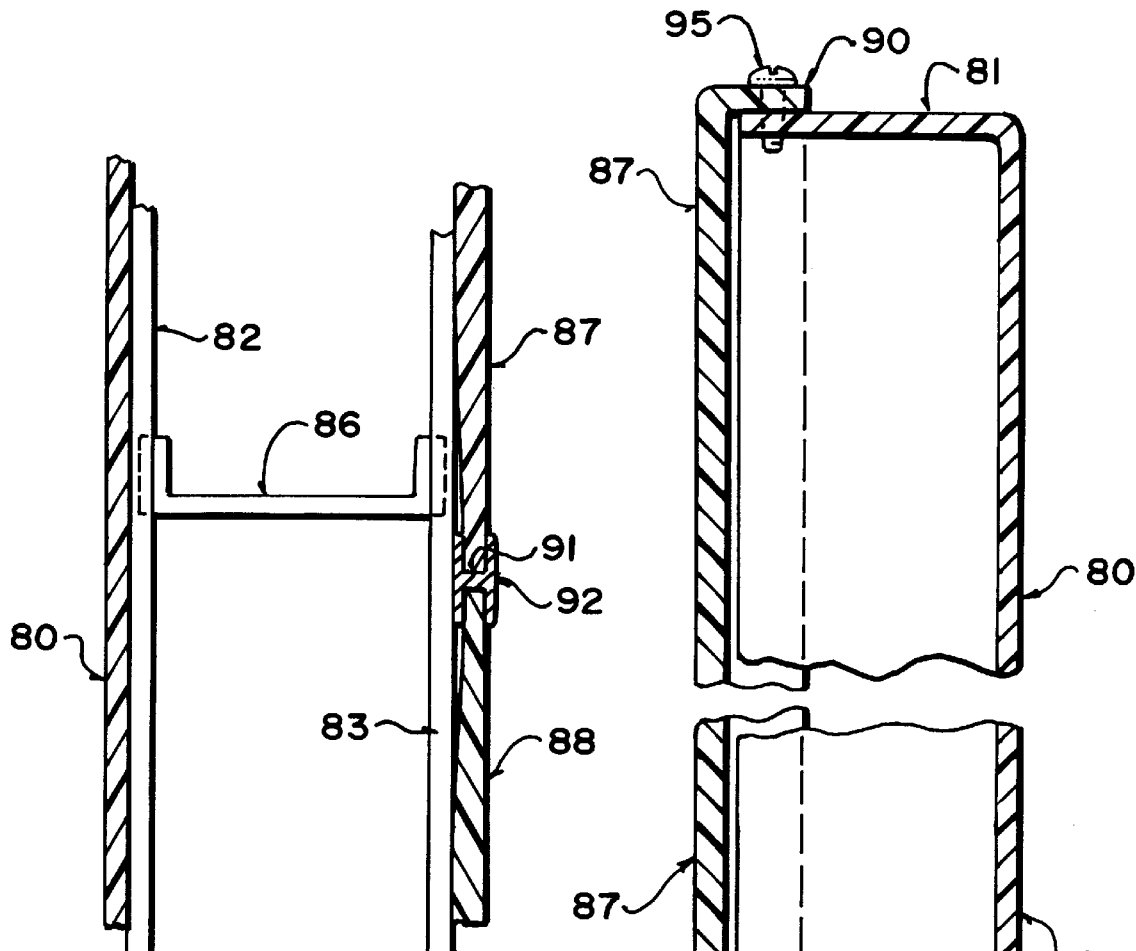
FIG. 6 is a vertical cross section along the lines 6—6 of FIG. 5 of the present invention.
FIG. 7 is a cross section along the lines 7—7 of FIG. 6 of the present invention.

Turning now to FIGS. 5, 6 and 7 there is shown an alternative arrangement of cover which includes a main rear wall 80 with a forwardly facing peripheral flange 81. The main rear wall includes slots as previously described which allow the main rear wall to fit over the shafts. The main rear wall is formed of a single piece moulded from glass fibre reinforced resin using a lay-up process into a mold so that the mould defines the outside surface of the element and thus provides a smooth attractive appearance while the inside surface is formed by the rough layer of glass fibres in the conventional process.

Across the bottom of the main wall 80 is provided a stiffener rib 82 in the form of a channel bolted to the inside surface of the main wall 80.

Parallel to the stiffener member 82 is provided an additional stiffener member 83 which extends across the full width of the main rear wall from a fastener 84 at one end to a second fastener 85 at the opposed end, the fasteners being attached to the peripheral wall 81. A plurality of spaces 86 are arranged at spaced positions along the length of the stiffener 83 so as to fold the channel shaped stiffeners 82 and 83 at a constant spacing along their full length equal to the width of the peripheral wall 81.

The cover further includes a front cover portion similar to that previously described and shaped identically to the shape of the main rear wall 80. The front cover portion in this embodiment is divided into three sections 87, 88 and 89. The three sections are manufactured in a single step as an integral body moulded similarly to that of the rear wall with a rearwardly extending flange portion 90 overlying the flange 81 as previously described. The front cover is shaped identically to that of the rear cover so that the bottom edges are coextensive and are positioned just below the stiffener members 82 and 83.

The front cover is cut into three separate portions 87, 88 and 89 along dividing lines 91. At the dividing lines the portions 87 and 88 are connected by a H-shaped connector strip 92 extending along the line 91 and receiving the edges of the portions within the channel defined by the H-shaped connector strip. Similarly a second connector strip 93 is arranged along the junction between the portions 87 and 89.

The portions 88 and 89 include clips 51 as previously described attaching the flange 90 to the edge wall 81. The portions 88 and 89 each have two handles 53 as previously described. The center portion 87 is attached to the rear main wall by screws 95 connecting the flange 90 to the peripheral wall 81 and by screws 96 connecting through the main wall of the centre portion 87 into the stiffener member 83.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

I claim:

1. A belt cover for an oil pump jack,
   the pump jack comprising:
   a pump frame;
   a motor mounted on the frame and including a drive shaft with a drive pulley thereon,
   a main jack assembly;
   a driven shaft mounted on the main jack assembly for communicating power to the main jack assembly from the motor, the driven shaft including a driven pulley thereon for driving a receiving drive from the drive shaft:
   and a drive belt wrapped around the drive pulley and the driven pulley to define an upper belt run and a lower belt run, the drive pulley, driven pulley and the belt lying substantially in a common vertical plane at right angles to the horizontal drive shaft and the driven shaft;
   the belt cover comprising:
   a main cover portion having:
   a main rear wall arranged to lie parallel to and adjacent to the plane, the main wall extending to a peripheral edge which has a top portion above the upper run, a bottom portion below the lower run, a first end portion beyond the drive pulley and a second end portion beyond and driven pulley;
   and an edge wall at right angles to and extending forwardly from the main wall and arranged around at least a part of the peripheral edge including the top portion and the end portions, the edge wall having a width from the main wall such that it extends to a plane forwardly of the belt opposite the main rear wall;
   a front cover portion having:
   a main front wall parallel to and substantially coextensive with the main rear wall;
   and a peripheral lip at right angles to and extending rearwardly from the front wall and arranged around at least a part of the peripheral edge including the top portion and the end portions so as to engage over the edge wall in at least partly overlapping arrangement;
   and a plurality of fasteners locating the front cover portion on the main cover portion;
   the front cover portion and the main cover portion being formed from a molded plastics material.

2. The cover according to claim 1 wherein the cover portions are molded from a fiber reinforced resin material.

3. The cover according to claim 2 wherein the cover portions are molded on the same mold.

4. The cover according to claim 1 wherein the cover portions are both open along a bottom edge so as to be free from the peripheral wall and the peripheral lip at the bottom edge.

5. The cover according to claim 4 wherein each of the cover portions has a substantially rigid stiffener member attached along the bottom edge.

6. The cover according to claim 5 wherein the stiffener members each comprise an angle iron.

7. The cover according to claim 5 wherein the rear main cover portion has two slots therein extending from the bottom edge for allowing the drive and driven shafts respectively to slide into position within the main rear wall and wherein the stiffener member extends across the slots.

8. The cover according to claim 1 wherein the rear main cover portion has two slots therein extending from the bottom edge for allowing the drive and driven shafts respectively to slide into position within the main rear wall.

9. The cover according to claim 7 wherein each of the slots extends parallel to the respective adjacent end portion of the peripheral wall, and wherein the slots are arranged at an angle to each other.

10. The cover according to claim 9 wherein the end portion of the peripheral wall at the driven pulley follows the curvature of the pulley and ends with a portion which is at an angle to the bottom run of the belt.

11. The cover according to claim 1 wherein the fasteners comprise clips having elements thereof mounted on the peripheral wall and the peripheral lip.

12. The cover according to claim 1 wherein the peripheral wall is wider than the peripheral lip so as to leave a part of the peripheral wall exposed beyond the edge of the peripheral lip.

13. The cover according to claim 1 wherein the main cover portion is mounted on the frame of the pump jack so as to remain in place thereon when the front cover portion is removed.

14. The cover according to claim 1 wherein the front cover portion is formed in a plurality of separate pieces divided at least one join line arranged from a top edge to a bottom edge of the cover.

15. The cover according to claim 14 wherein the pieces of the front cover portion are connected at the join line by a connector strip extending along the join line.

16. The cover according to claim 15 wherein the connector strip is H-shaped in cross-section.

17. The cover according to claim 14 wherein there is provided at least one.

18. The cover according to claim 14 wherein the pieces of the front cover include a central fixed piece and two removable end pieces.

19. The cover according to claim 18 wherein the central fixed piece includes a bottom rail and a pair of spacer members connected between the main cover and the front cover at the bottom rail.

* * * * *